(12) United States Patent
Zhao (10) Patent No.: US 10,317,215 B2
(45) Date of Patent: Jun. 11, 2019

(54) INTERACTIVE GLASSES AND NAVIGATION SYSTEM

(71) Applicant: BOE TECHNOLOGY GROUP CO., LTD., Beijing (CN)

(72) Inventor: Kening Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/821,906

(22) Filed: Nov. 24, 2017

(65) Prior Publication Data

US 2018/0094937 A1 Apr. 5, 2018

Related U.S. Application Data

(63) Continuation-in-part of application No. 14/803,648, filed on Jul. 20, 2015, now abandoned.

(30) Foreign Application Priority Data

Jan. 9, 2015 (CN) .......................... 2015 1 0012011

(51) Int. Cl.
*G01C 21/00* (2006.01)
*G06F 3/01* (2006.01)
(Continued)

(52) U.S. Cl.
CPC ......... *G01C 21/206* (2013.01); *G01C 21/365* (2013.01); *G02B 27/017* (2013.01);
(Continued)

(58) Field of Classification Search
CPC .......... G01C 21/206; G02B 2027/0138; G02B 2027/014; G02B 2027/0141;
(Continued)

(56) References Cited

U.S. PATENT DOCUMENTS

| 6,089,717 A * | 7/2000 | Iwai ..................... H04N 9/3105 |
| | | 348/E9.027 |
| 2013/0127980 A1* | 5/2013 | Haddick ................. G06F 3/013 |
| | | 348/14.08 |

(Continued)

FOREIGN PATENT DOCUMENTS

| CN | 101127072 A | 2/2008 |
| CN | 102906623 A | 1/2013 |

(Continued)

OTHER PUBLICATIONS

First Office Action dated Jun. 1, 2016 issued in corresponding Chinese Application No. 201510012011.6.

*Primary Examiner* — Harry Y Oh
(74) *Attorney, Agent, or Firm* — Nath, Goldberg & Meyer; Joshua B. Goldberg (57) ABSTRACT

The present invention provides interactive glasses including a frame, a lens, and a positioning unit, a processing unit and a display unit all fixed to the frame. The positioning unit is used for obtaining location information of current location of the interactive glasses; the processing unit is used for obtaining a relative location relation between the current location and a target location and the information of a route from the current location to the target location according to the location information of the current location and the target location; and the display unit is used for displaying image information of the route from the current location to the target location. Accordingly, the present invention further provides a navigation system. The interactive glasses can provide route from the current location to the target location for users to enable users to reach the target location quickly.

19 Claims, 2 Drawing Sheets

(51) Int. Cl.
*G02B 27/01* (2006.01)
*G01C 21/20* (2006.01)
*G02C 11/00* (2006.01)
*G01C 21/36* (2006.01)
*G06T 19/00* (2011.01)

(52) U.S. Cl.
CPC ..... *G02B 27/0172* (2013.01); *G02B 27/0176* (2013.01); *G02C 11/10* (2013.01); *G06F 3/011* (2013.01); *G02B 2027/014* (2013.01); *G02B 2027/0138* (2013.01); *G02B 2027/0141* (2013.01); *G02B 2027/0169* (2013.01); *G02B 2027/0178* (2013.01); *G06T 19/006* (2013.01)

(58) Field of Classification Search
CPC .... G02B 2027/0169; G02B 2027/0178; G02B 2027/0196; G02B 27/0172; G02B 27/0176; G02C 11/10
USPC .......................................................... 701/428
See application file for complete search history.

(56) References Cited

U.S. PATENT DOCUMENTS

| | | | | |
|---|---|---|---|---|
| 2013/0278631 | A1* | 10/2013 | Border | G02B 27/017 345/633 |
| 2014/0101592 | A1* | 4/2014 | Costa | G06F 3/0482 715/772 |
| 2014/0267419 | A1* | 9/2014 | Ballard | G06T 11/00 345/633 |
| 2015/0169049 | A1* | 6/2015 | Ko | G06F 3/013 345/156 |
| 2016/0078278 | A1* | 3/2016 | Moore | G06K 9/00201 345/8 |

FOREIGN PATENT DOCUMENTS

| | | |
|---|---|---|
| CN | 103591951 A | 2/2014 |
| CN | 203587827 U | 5/2014 |
| CN | 103858073 A | 6/2014 |
| CN | 203658670 U | 6/2014 |
| CN | 103954276 A | 7/2014 |
| CN | 104090383 A | 10/2014 |

* cited by examiner

FIG. 5

INTERACTIVE GLASSES AND NAVIGATION SYSTEM

CROSS-REFERENCE TO RELATED APPLICATION

This is a Continuation-In-Part of U.S. patent application Ser. No. 14/803,648, filed on Jul. 20, 2015, an application claiming priority to Chinese Patent Application No. 201510012011.6, filed on Jan. 9, 2015, the disclosure of which is incorporated by reference herein in its entirety.

FIELD OF THE INVENTION

The present invention relates to the field of display technology, and particularly relates to interactive glasses and a navigation system.

BACKGROUND OF THE INVENTION

With the development of the human history, more and more exhibits about crafts, history and culture are worth to be displayed in museums for public viewing, as a result, the area of the museum becomes larger, the map of the exhibition hall becomes more complex, and the type and quantity of exhibits become larger. In such cases, visitors waste a lot of time in inquiring the way or finding the exhibition hall for a desired exhibit, which causes the museums to be crowded. In addition, there are numerous exhibits in the museum, and a visitor can hardly know an exhibit intuitively and comprehensively without contacting the exhibit closely.

SUMMARY OF THE INVENTION

An object of the present invention is to provide interactive glasses and a navigation system, to enable a user wearing the interactive glasses to get to the target location quickly.

In order to realize the above object, the present invention provides interactive glasses, including a frame and a lens, and the interactive glasses further include a positioning unit, a processing unit and a display unit, which are fixed to the frame, wherein the positioning unit is used for obtaining location information of the current location of the interactive glasses;

the processing unit is used for obtaining a relative location relation between the current location and a target location and information of a route from the current location to the target location according to the location information of the current location and location information of the target location; and the display unit is used for displaying image information for the route from the current location to the target location.

Preferably, the interactive glasses further include a storage unit, which is used for prestoring the location information of the target location, and the processing unit is further used for reading the location information of the target location from the storage unit; or the interactive glasses further include a target location acquisition unit, which is used for obtaining the location information of the target location, and the processing unit is further used for controlling the target location acquisition unit to obtain the location information of the target location.

Preferably, the display unit includes a display panel, a projection lens and an optical film, the projection lens is arranged between the display panel and the optical film, and is used for refracting light emitted from the display panel to be parallel light emitted to the optical film, the optical film is capable of reflecting the parallel light to the lens, and the parallel light then enters into an eye through the lens.

Preferably, the optical film is a transflective film, which is capable of transmitting ambient light to the lens while reflecting the parallel light, and then the ambient light and the parallel light enters into the eye through the lens.

Preferably, the interactive glasses further include a mount housing, which is connected to the frame, and the positioning unit and the processing unit are integrated inside the mounting housing.

Preferably, the display panel and the projection lens are arranged inside the mounting housing, a light outlet is arranged on the mount housing, and a fixing piece for fixing the optical film is arranged at the light outlet.

Preferably, the fixing piece is made of a light-transmissive glass material, a cavity for holding the optical film is formed in the fixing piece, the optical film is arranged in the cavity, and both a side surface of the fixing piece far away from the lens and a side surface of the fixing piece arranged at the light outlet are planes.

Preferably, the mounting housing includes a first housing part and a second housing part, the first housing part is connected to a leg of the frame and extends in a direction that a user wearing the interactive glasses faces to, so that first housing part protrudes from the lens, the second housing part is arranged on a side of a part of the first housing part that protrudes from the lens, and said side faces to the lens, the display panel and the projection lens are arranged inside the second housing part, and the light outlet is arranged in a side surface of the second housing part far away from the first housing part.

Preferably, the interactive glasses further include an image acquisition unit, which is used for collecting a marked image and outputting the same to the processing unit, and the processing unit is further used for converting the marked image into information corresponding to the marked image.

Preferably, the interactive glasses further include a storage unit, which is used for prestoring the information corresponding to the marked image, and the processing unit is further used for reading the information corresponding to the marked image from the storage unit; or the interactive glasses further include a communication unit connected to the processing unit, the communication unit is connected to a server, and the processing unit is further used for obtaining the information corresponding to the marked image from the server according to the marked image.

Preferably, the processing unit is further used for controlling the display unit to display the information corresponding to the marked image.

Preferably, the image acquisition unit includes a camera, which is arranged on a side surface of the second housing part far away from the lens, and lens of the camera faces to a direction to which a user wearing the interactive glasses faces.

Preferably, the interactive glasses further include a transmission unit, which is used for enabling the communication unit and the storage unit to communicate with a terminal with inputting and outputting functions, respectively, and the terminal with inputting and outputting functions is capable of being connected to the server through the communication unit, so as to obtain network information corresponding to information inputted to the terminal with inputting and outputting functions, and display the network information by the display unit, information stored in the storage unit is capable of being outputted to the terminal with inputting the outputting functions through the transmission unit.

Preferably, the interactive glasses further include an operating unit connected to the processing unit, and the operating unit is used for sending a first operating instruction to the processing unit, and the processing unit is further used for operating accordingly according to the first operating instruction.

Preferably, the operating unit includes an operating key and a touch panel both arranged on the first housing part, the operating key and the touch panel penetrate a wall of the first housing part and are connected to the processing unit, and are used for sending the first operating instruction to the processing unit, and the processing unit is further used for controlling the display unit to display image information corresponding to the first operating instruction according to the first operating instruction.

Preferably, the operating unit includes an image acquisition shortcut key arranged on the first housing part, the image acquisition shortcut key penetrates the wall of the first housing part and is connected to the processing unit, and is used for inputting, to the processing unit, a second operating instruction for operating the image acquisition unit, and the processing unit is further used for turning on or turning off the image acquisition unit according to the second operating instruction.

Preferably, the operating unit further includes a voice input module, which is used for receiving a voice signal and converting the voice signal into the first operating instruction, or into the second operating instruction for operating the image acquisition unit.

Preferably, the interactive glasses further include a voice output unit, which is used for outputting voice information corresponding to the image information being displayed by the display unit.

Accordingly, the present invention further provides a navigation system including a server and the above interactive glasses, the interactive glasses further include a communication unit connected to the processing unit, the communication unit is further connected to a server, and the positioning unit of the interactive glasses is capable of obtaining the location information of the current location of the interactive glasses according to relevant information in the server.

Preferably, the server is capable of pushing service information to the processing unit of the interactive glasses through the communication unit, the display unit is capable of displaying service information marks corresponding to the service information, and the service information includes information about objects within a preset range.

Preferably, the service information mark includes text and/or two-dimensional image mark.

Preferably, the interactive glasses further include a operating unit connected to the processing unit, which is used for sending a third operating instruction to the processing unit, and the processing unit is further used for controlling the display unit to display the corresponding service information mark according to the third operating instruction.

In the present invention, the processing unit of the interactive glasses can obtain the information of the route from the current location to the target location, a user can see the image (e.g., thumbnail map) of the route from the current location to the target location through the display unit, and can thus get to the target location quickly according to the route. Further, after the image acquisition unit of the interactive glasses collects the information about the marked image, the display unit of the interactive glasses can display the image information corresponding to the marked image, and the user can obtain the detailed information of an exhibit without stepping forward to check the message board in front of the exhibit, when visiting the museum. In the navigation system, the server can push service information to the processing unit of the interactive glasses, and the user can control the display unit to display the pushed service information by the operating unit.

BRIEF DESCRIPTION OF THE DRAWINGS

The accompanying drawings, which constitute a part of the specification, are used for providing further understanding of the present invention, and for explaining the present invention together with the following specific implementations, rather than limiting the present invention. In the accompanying drawings.

DETAILED DESCRIPTION OF THE INVENTION

Embodiments of the present invention will be described in detail below with reference to the accompanying drawings. It should be understood that, embodiments described here are merely used for explaining and illustrating the present invention, rather than limiting the present invention.

Figure 1:
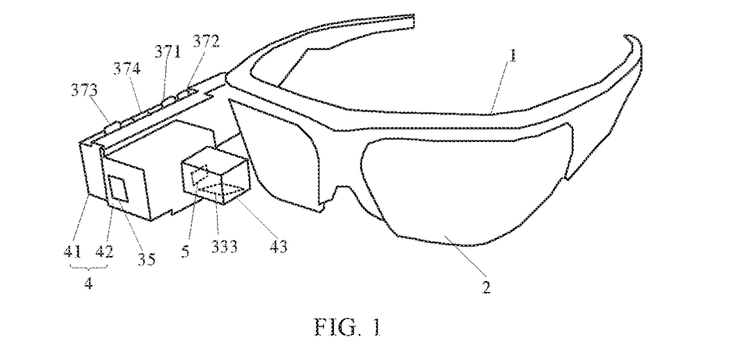
FIG. 1 is a schematic diagram of an exterior of interactive glasses provided by an embodiment of the present invention.
Figure 3:
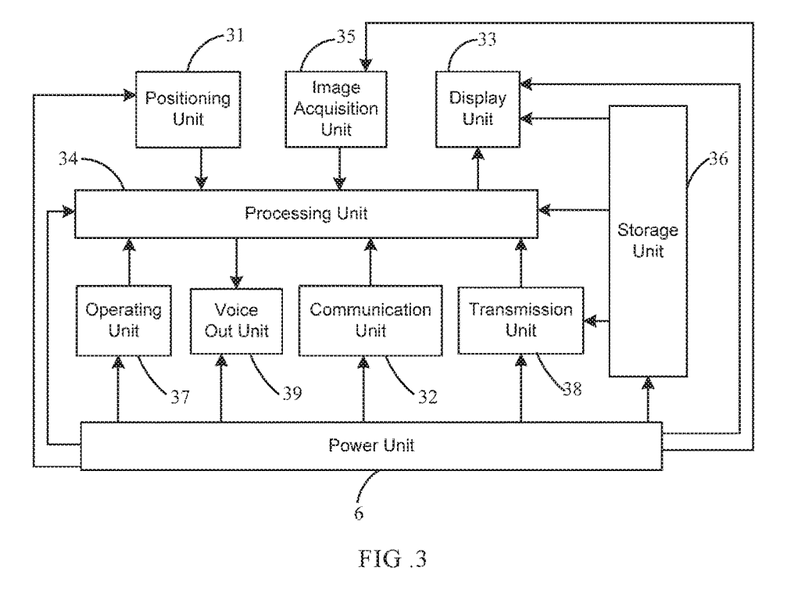
FIG. 3 is a schematic diagram of a structure of interactive glasses provided by an embodiment of the present invention.

As a first aspect of the present invention, there is provided interactive glasses, as shown in FIG. 1, the interactive glasses include a frame 1 and a lens 2. As shown in FIG. 3, the interactive glasses further include a positioning unit 31, a processing unit 34 and a display unit 33 that are fixed to the frame 1.

The positioning unit 31 is used for obtaining location information of a current location of the interactive glasses, The processing unit 34 is used for obtaining a relative location relation between the current location and a target location and information of a route from the current location to the target location according to the location information of the current location and location information of the target location.

The display unit 33 is used for displaying image information for the route from the current location to the target location.

The positioning unit 31 and the display unit 33 are connected to the processing unit 34, respectively.

The interactive glasses of the present invention can determine the current location of a user through the positioning unit 31, the user can see an image (e.g. a thumbnail map) of the route from the current location to the target location through the display unit 33, and can thus get to the target location quickly according to the image of the route.

It should be noted that the positioning unit 31, the display unit 33 and the processing unit 34 would be understood by any person of ordinary skill in the art. By way of non-limiting example, suitable positioning units 31 may include GPS (Global Position System), navigation system, smart phones with positioning function, and any positioning devices that achieve indoor positioning function based on GPS, WiFi, UWB (ultrawideband) and/or RFID (Radio Frequency Identification) techniques. Suitable processing unit units 34 may include, but are not limited to, CPU (Central Processing Unit), ARM (Advanced RISC Machines), FFGA (Field Programmable Gate Array), and any devices having data processing function that can process data provided by other units such as the positioning unit 31. Suitable display units 33 may include, but are not limited to, NTE (near-to-eye) display systems, such as waveguide glasses, google glasses, VR (virtual reality) glasses, e.g., VR glasses provided by Oculus VR, LLC.

Figure 2:
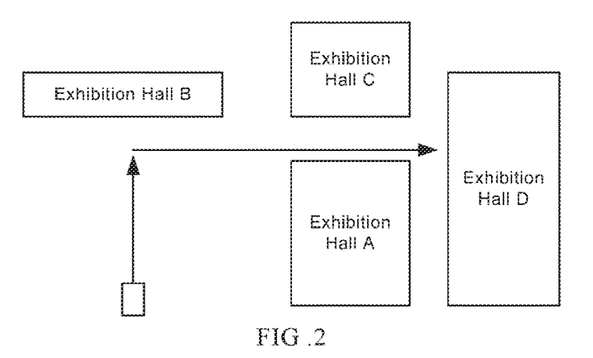
FIG. 2 is a schematic diagram of a route through which a user gets to a target location by using interactive glasses provided by an embodiment of the present invention.

As a specific implementation of the present invention, the interactive glasses may further include a storage unit 36, which is used for prestoring the location information of the target location. The processing unit can obtain the relative location relation between the current location and the target location according to the location information of the current location and the location information of the target location which is read from the storage unit, after the positioning unit obtains the location information of the current location. As another specific implementation of the present invention, the interactive glasses may further include a target location acquisition unit, which is used for obtaining the location information of the target location under the control of the processing unit 34. The processing unit 34 may obtain the relative location relation between the current location and the target location according to the location information of the current location and the location information of the target location which is obtained by the target location acquisition unit. As shown in FIG. 2, the interactive glasses may be applied to an area (e.g., a museum) with many exhibition halls and complex layout. The target location acquisition unit may be connected to a server of the museum, so as to obtain the location information of each exhibition hall (e.g. exhibition halls A, B, C and D as shown in FIG. 2) of the museum. If the target location is the exhibition hall D, and the display unit 33 may display the image information for the route from the current location to the exhibition hall D, thus a user can find the exhibition hall D quickly according to the route.

Figure 4:
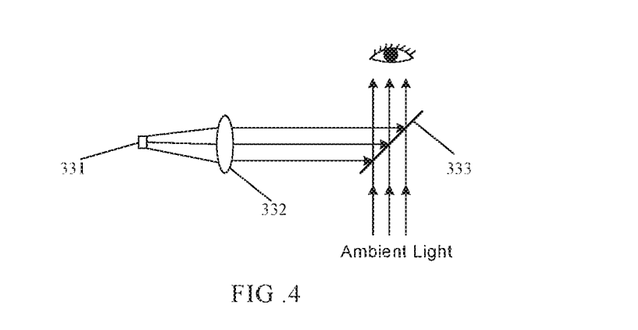
FIG. 4 is a schematic diagram illustrating principle of a display unit of interactive glasses provided by an embodiment of the present invention; and, FIG. 5 is a schematic diagram of a structure of a navigation system provided by an embodiment of the present invention.

It should be understood that, there are various ways to determine the target location of a user, such as inputting the target location to the interactive glasses by the user, or setting one exhibition hall or one exhibit displayed on a display panel 331 (described later) of the display unit 33 as the target location, which is not limited by the present invention. After the target location is determined by the user, the target location acquisition unit obtains, under the control of the processing unit 34, the location information of the determined target location from the storage unit 36. In some embodiments, the target location acquisition unit may be computer-readable instructions being executable by a processor to obtain the location information of the determined target location from the storage unit 36. In order that the user can see the image displayed by the display unit, as shown in FIG. 4, the display unit 33 may include the display panel 331, a projection lens 332 and an optical film 333, and the projection lens 332 is arranged between the display panel 331 and the optical film 333. The projection lens 332 is used for refracting light emitted from the display panel 331 to form parallel light emitted to the optical film 333. The optical film 333 may reflect the parallel light to the lens 2, and then the parallel light enters into an eye through the lens 2, thereby enabling the user to see the image displayed by the display panel 331.

In order to allow the user to see the surroundings while watching the image displayed by the display unit 33, further, the optical film 333 may be a transflective film, which can transmit ambient light to the lens while reflecting the parallel light, and thus the ambient light and the parallel light enters into the eye through the lens, thereby enabling the user to see the image displayed by the display panel 331 and the surroundings at the same time.

As shown in FIG. 1, the optical film 333 may reflect light emitted from the display panel to a single lens 2. In this case, one eye of the user can see the surroundings while the other eye can see the surroundings and the image displayed by the display unit at the same time, so that both eyes of the user can see the surroundings, and the user's movement is not encumbered.

As shown in FIG. 1, the interactive glasses may further include a mount housing 4 connected to the frame 1. The positioning unit 31 and the processing unit 34 are integrated inside the mounting housing 4. In addition, the display panel 331 and the projection lens 332 may be arranged inside the mounting housing 4 as well. In this case, a light outlet 5 (as shown in FIG. 1) is arranged on the mount housing 4, and a fixing piece 43 for fixing the optical film 33 is arranged at the light outlet 5. Light emitted from the display panel 331 is refracted to be parallel light by the projection lens 332, and the parallel light is emitted to the optical film 333 after passing through the light outlet 5. The optical film 333 reflects the parallel light exiting from the light outlet 5 to the lens 2, thereby enabling the user to see the image displayed by the display panel.

Specially, the fixing piece 43 may be made of a light-transmissive glass material. A cavity for holding the optical film 333 is formed in the fixing piece 43, and the optical film 333 is arranged in the cavity (as shown in FIG. 1). Both a side surface of the fixing piece 43 far away from the lens 2 and a side surface of the fixing piece 43 arranged at the light outlet 5 are planes, so that both ambient light and light emitted from the display panel are emitted to the optical film 333 in a parallel way. Since the fixing piece 43 is made of transparent glass, it will not affect the light propagation while fixing the optical film 333. In addition, a side surface of the fixing piece 34 facing to the lens 2 may be a convex surface or a plane.

As shown in FIG. 1, the mounting housing 4 may include a first housing part 41 and a second housing part 41. The first housing part 41 is connected to a leg of the frame 1 and extends in a direction that the user wearing the interactive glasses faces to, so that the first housing part 41 protrudes from the lens. The second housing part 42 is arranged on a side surface of a part of the first housing part 41 that protrudes from the lens 2, and the side faces to the lens 2. The display panel and the projection lens may be arranged inside the second housing part 42, and the light outlet 5 is arranged in a side surface of the second housing part 42 far away from the first housing part 41. The sizes of the first housing part 41, the second housing part 42 and the fixing piece 43 may be determined based on the size of the interactive glasses, so that when the first housing part 41 is connected to a leg of the frame 1, the optical film 333 is able to reflect light emitted from the display panel to the lens 2 which is close to the leg connected to the first housing part 41.

Furthermore, as shown in FIGS. 1 and 3, the interactive glasses may further include an image acquisition unit 35 connected to the processing unit 34, and the image acquisition unit 35 is used for collecting a marked image and outputting the same to the processing unit 34. The marked image may be a two-dimension code or other mark with a distinguishing function, and the user uses the image acquisition unit 35 to scan the marked image, so as to obtain the required information. The information corresponding to the marked image may be relevant text description, and/or picture(s) corresponding to the text description.

Specially, the processing unit 34 may convert the marked image into the corresponding information, and control the display unit 33 to display the information corresponding to the marked image. Taking museum for example, a marked image corresponding to an exhibit may be arranged in front of the exhibit in an exhibition hall, and the information corresponding to the marked image may be picture(s) and/or text description of the exhibit. After the marked image is collected by the image acquisition unit 35, the processing unit 34 can convert the marked image into the relevant picture(s) and/or test description, and controls the display unit 33 to display the same.

As a specific implementation of the present invention, the storage unit 36 of the interactive glasses may further pre-store the information corresponding to the marked image, and the processing unit 34 may control the display unit 33 to display the information corresponding to the marked image.

As another specific implementation of the present invention, the interactive glasses may further include a communication unit 32 connected to the processing unit, and the communication unit 32 may be connected to a server. The processing unit 34 may obtain the information corresponding to the marked image from the server according to the marked image, and control the display unit 33 to display the information corresponding to the marked image.

The communication unit 32 may be any device that can be connected to the server through wired or wireless communication protocol, such as RS232 interface, a gateway to achieve ADSL (Asymmetrical Digital Subscriber Loop) connection, RS485 interface, CAN (Controller Area Network) bus, TCP/IP interface, Bluetooth access port, wireless network adapter, Zigbee module, Z-wave interface or other wired or wireless communication device. In the above implementations, the information corresponding to the marked image is the target information that the user needs to know about. For example, a marked image corresponding to an exhibition hall may be provided at the doorway of the exhibition hall, and the information corresponding to the marked image may include the name of the exhibition hall, the map of the exhibition hall, the distribution map of exhibits in the exhibition hall, etc. After the image acquisition unit 35 scans the marked image of the exhibition hall, the processing unit 34 may control the display unit 33 to display the specific information such as the name of the exhibition hall, the map of the exhibition hall, the distribution map of exhibits in the exhibition hall, etc.

After the user wears the interactive glasses, it is only required to scan the marked image by using the acquisition unit 35 to know the detailed information about an exhibit.

The image acquisition unit 35 would be understood by any person of ordinary skill in the art. By way of non-limiting example, suitable image acquisition units 35 include cameras, CODs (Charge Coupled Devices), thermal infrared imagers. In some embodiments, the image acquisition unit 35 may include a camera. The camera is arranged on a side surface of the second housing part 42 far away from the lens 2, and the lens of the camera faces to a direction to which the user wearing the interactive glasses faces. After the user wears the interactive glasses, he/she can scan the marked image (such as a two-dimensional mark, etc.) ahead by using the camera.

In addition, the storage unit 36 may also be integrated inside the mounting housing 4. The storage unit 36 may include, but is not limited to, a flash memory, a read-only memory (ROM) and an erasable-programmable read-only memory (EPROM).

Furthermore, the interactive glasses may further include: a transmission unit 38, which is connected to the processing unit 34 and is used for allowing the communication unit 32 and the storage unit 36 to communicate with a terminal with inputting and outputting functions, respectively. In other words, the communication unit 32 and the storage unit 36 communicate with the terminal with inputting and outputting functions through the transmission unit 38, respectively. The terminal with inputting and outputting functions may also be connected to the server through the communication unit 32, so as to obtain network information corresponding to the information inputted to the terminal with inputting and outputting functions, and the display unit 33 may display the network information. The information stored in the storage unit 36 may be outputted to the terminal with inputting and outputting functions through the transmission unit 38.

The terminal with inputting and outputting functions may be a mobile phone. By connecting the mobile phone to the interactive glasses during the visit of a museum, the user may input, through the mobile phone, content that he/she needs to know about during the visit, and the display unit 33 displays the information, which is stored in the storage unit 36, corresponding to the content that he/she needs to know about, or by connecting the mobile phone to the server through the communication unit 32, the content that he/she needs to know about is searched in the server and then displayed by the display unit 33, so that the user can comprehensively know about the information of an exhibit.

When the image acquisition unit 35 includes the camera, photos can be taken by the camera and stored in the storage unit 36. The pictures or photos stored in the storage unit 36 may be displayed by the display unit 33 of the interactive glasses, or outputted to the terminal (such as a mobile phone, a computer, etc.) with inputting and outputting functions through the transmission unit 38 for display. Therefore, for easy check, the information stored in the storage unit 36 may be outputted to and stored in a common terminal with inputting and outputting functions by the user.

The transmission unit 38 may implement transmission between the terminal with inputting and outputting functions and the communication unit 32 (or the storage unit 36) through the same communication protocol (e.g., Bluetooth) as the communication unit 32. In this case, the communication unit 32 may also serve as the transmission unit 38. In some embodiments, the transmission unit 38 implements transmission through communication protocol different from the communication unit 32. In this case, a separate transmission unit 38 is required. For example, the communication unit 32 may be a Bluetooth access port, whereas the transmission unit may be a USB interface. Suitable communication units 32 include, but are not limited to, USB interface, RS232 interface, a gateway to achieve ADSL (Asymmetrical Digital Subscriber Loop) connection, RS485 interface, CAN (Controller Area Network) bus, TCP/IP interface, wireless network adapter, Zigbee module, Z-wave interface, Bluetooth access port, etc, as long as the communication unit 32 can be connected to a terminal with inputting and outputting functions, such as a mobile phone, a computer, etc.

Furthermore, the interactive glasses may further include an operating unit 37 connected to the processing unit 34. The operating unit 37 may send a first operating instruction to the processing unit 34, and the processing unit 34 may operate accordingly according to the first operating instruction.

It should be noted that, the first operating instruction does not refer to a specific instruction, but may include a class of instructions sent to the processing unit 34. For example, after the image acquisition unit 35 scans the marked image at the doorway of an exhibition hall, the display unit 33 may display information such as the name of the exhibition hall, the map of the exhibition hall and the distribution map of exhibits in the exhibition hall, etc. The first operating instruction may include a selecting instruction for selecting a predetermined exhibit, and the processing unit 34 controls the display unit 33 to display picture(s), name and relevant presentation of the predetermined exhibit according to the selecting instruction. The first operating instruction may further include a return instruction, according to the return instruction, the processing unit 34 controls the display unit 33 to redisplay the information such as the name of the exhibition hall, the map of the exhibition hall and the distribution map of exhibits in the exhibition hall, etc.

Specifically, as shown in FIG. 1, the operating unit (not shown in FIG. 1) may include an operating key (e.g., an OK key 371 and a return key 372 in FIG. 1) and a touch panel 374 both arranged on the first housing part 41. The operating key and the touch panel 374 may penetrate a wall of the first housing part 41 and be connected to the processing unit 34, so as to send the first operating instruction to the processing unit 34. The processing unit 34 is further used for controlling the display unit 33 to display image information corresponding to the first operating instruction according to the first operating instruction. For example, when the display unit 33 (not shown in FIG. 1) inside the second housing part 42 displays the icons of a plurality of different exhibits, the touch panel 374 may be used for controlling a cursor displayed by the display panel 331 to move between the icons of the different exhibits. When the cursor is moved to the icon of a certain exhibit, the display unit 33 may be controlled to display the specific information of the exhibit by pressing the OK key, such as picture(s), name and relevant presentation of the exhibit, etc. After the information has been read, display page on the display panel 331 returns to the page on which the icons of the plurality of different exhibits are displayed, by pressing the return key 372.

In addition, as shown in FIG. 1, the operating unit 37 (not shown in FIG. 1) may further include an image acquisition shortcut key 373 arranged on the first housing part 4. The image acquisition shortcut key 373 may penetrate a wall of the first housing part 41 and be connected to the processing unit (not shown in FIG. 1), so as to send a second operating instruction to the processing unit 34. The processing unit 34 is further used for turning on or turning off the image acquisition unit (not shown in FIG. 1) according to the second operating instruction. In another word, the image acquisition shortcut key 373 can be used for controlling the processing unit 34 to turn on or turn off the image acquisition unit 35, thereby controlling the image acquisition unit 35 to start or stop image acquisition.

It should be noted that, the second operating instruction may be a class of instructions which is used for controlling on/off of the image acquisition unit 35. For example, when a user sees the marked images at the doorway of an exhibition hall, if the user hopes to obtain the detailed information of the exhibition hall, the user may start image acquisition by pressing the image acquisition shortcut key 373, thereby obtaining the information such as the name of the exhibition hall, the map of the exhibition hall and the distribution map of exhibits in the exhibition hall, etc; when the image acquisition by the image acquisition unit 35 is not necessary, for example, when the user wants to concentrate on an exhibit, image acquisition may be stopped by pressing the image acquisition shortcut key 373.

In the present invention, the operating unit 37 may further include a voice input module, which is used for receiving a voice signal and converting the voice signal into the first operating instruction, or into the second operating instruction for operating the image acquisition unit 35. The user may perform voice control through the voice input module. If the voice signal is converted into the first operating instruction by the voice input module, the processing unit 34 may control the display unit 33 to display the image information corresponding to the first operating instruction. For example, when the user selects a certain exhibit by voice, the processing unit 34 may control the display unit 33 to display the specific information of the exhibit, such as picture(s), name and relevant presentation of the exhibit, etc. If the voice signal is converted into the second operating instruction by the voice input module, the processing unit 34 may control the image acquisition unit 35 to start or stop the image acquisition.

In order to improve the sensory experience of the user, the interactive glasses may further include a voice output unit 39 connected to the processing unit 34, the voice output unit 39 is used for outputting voice information corresponding to the image information being displayed by the display unit 33. The user can not only see the image(s) displayed by the display unit 33, but can also hear the voice corresponding to the image(s) at the same time.

Specifically, when the display unit 33 displays the image information for the route from the current location to the target location, the processing unit 34 may control the voice output unit 39 to output the voice corresponding to the image information of the route. After the image acquisition unit 35 collects the marked image in front of the exhibition hall, the display unit 33 may display the information such as the name of the exhibition hall, the map of the exhibition hall and the distribution map of exhibits in the exhibition hall, etc., and at the moment, the processing unit 34 may further control the voice output unit 39 to output the voice corresponding to the information of the exhibition hall, for example, the name of the exhibition hall, the number of exhibits in the exhibition hall, the distribution of exhibits, etc. are displayed. After the image acquisition unit 35 collects the marked image in front of exhibits, the display unit 33 may display the information such as pictures, names and relevant presentations of exhibits, etc., and at the moment, the processing unit 34 may further control the voice output unit 39 to output the voice corresponding to the information of the exhibits, for example, names and relevant presentations of the exhibits are displayed.

It should be understood that, the interactive glasses may further include a power unit 6, and as shown in FIG. 3, the positioning unit 31, the communication unit 32, the display unit 33, the processing unit 34, the image acquisition unit 35, the storage unit 36, the operating unit 37 and the voice output unit 39 are all connected to the power unit 6.

Figure 5:
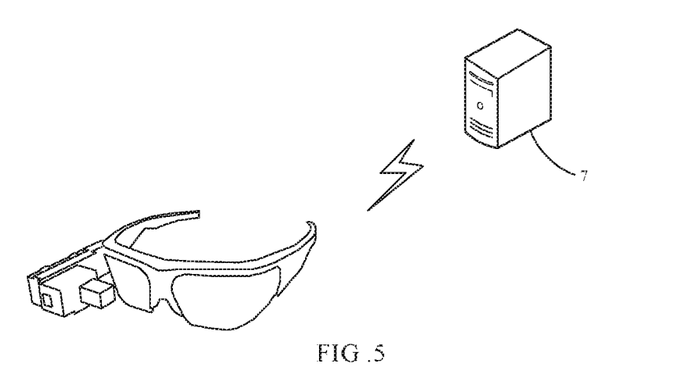

As a second aspect of the present invention, as shown in FIG. 5, there is provided a navigation system including a server 7 and the above interactive glasses. As described above, the interactive glasses include a communication unit connected to the processing unit, and the communication unit is able to be connected to the server 7. The positioning unit of the interactive glasses may obtain the location information of the current location according to relevant information in the server 7. For example, when a user wears the interactive glasses and enters the museum, the positioning unit of the interactive glasses may determine the current geographic location information of the user, and then determine the current position of the user in the museum according to the relevant information in the server.

Furthermore, the server 7 may push service information to the processing unit of the interactive glasses through the communication unit, so that the display unit may display a service information mark corresponding to the service information, and the service information includes information of objects within a preset range.

As described above, the interactive glasses may be used in museums, and the navigation system may be a museum navigation system. When a user visits the exhibition halls in a museum with wearing the interactive glasses, the positioning unit of the interactive glasses may obtain the location information of current location of the user, and the server 7 may push service information, which may be information of exhibits or service facilities within the preset range around the user, to the processing unit of the interactive glasses according to the location information.

Specifically, the service information mark includes text and/or two-dimensional image mark. The text may be names of exhibits or service facilities within the preset range around the user, the two-dimensional image mark may be thumbnails of exhibits or service facilities within the preset range around the user, as long as the user can know about exhibits or service facilities in the surrounding.

As described above, the interactive glasses further include a operating unit connected to the processing unit, the operating unit is used for sending a third operating instruction to the processing unit, and the processing unit may control the display unit to display the corresponding service information mark according to the third operating instruction.

For example, the server 7 may push information of exhibits or service facilities within the preset range in the surrounding to the processing unit of the interactive glasses according to the current location of the interactive glasses, so that the display unit displays name or thumbnail of each of the exhibits and service facilities in the service information. At the moment, the third operating instruction may be sent to the processing unit through the operating unit. Similar to the first operating instruction, the third operating instruction may be a selecting instruction, a return instruction, etc. A certain exhibit or service facility may be selected by the selecting instruction, and according to the selecting instruction, the processing unit may control the display unit to display the service information mark of the exhibit or the service facility corresponding to the selecting instruction, that is, to display the name or the thumbnail of the exhibit or the service facility.

From the above description of the interactive glasses and the navigation system, it can be seen that the interactive glasses can determine the current location of the user through the positioning unit, and obtain the information of the route from the current location to the target location through the processing unit. A user can see the image of the route from the current location to the target location, such as a thumbnail map, through the display unit, and can thus get to the target location quickly according to the route. Further, after the image acquisition unit of the interactive glasses collects the marked image, the display unit of the interactive glasses can display the image information corresponding to the marked image, and the user can obtain the detailed information of an exhibit without stepping forward to check the message board in front of the exhibit, when visiting the museum. In the navigation system, the server can push service information to the processing unit of the interactive glasses, and the user can control the display unit to display the pushed service information through the operating unit.

It should be understood that, the above embodiments are merely used for explaining the principle of the present invention, but the present invention is not limited thereto, a person skilled in the art can make various variations and modifications without departing from the spirit and essence of the present invention, and these variations and modifications are also construed as falling within the protection scope of the present invention.

The invention claimed is:

1. Interactive glasses, including a frame and a lens, wherein
    the interactive glasses further include a positioning unit, a processing unit and a display unit that are fixed to the frame, wherein
    the positioning unit is configured to obtain location information of a current location of the interactive glasses and transmit the location information of the current location to the processing unit;
    the processing unit is configured to obtain a target location and information of a route from the current location to the target location according to the location information of the current location and location information of the target location and to transmit the information of the route from the current location to the target location; and
    the display unit is configured to display image information for the route from the current location to the target location to a user wearing the interactive glasses, the display unit includes a display panel, a projection lens and an optical film, the projection lens is arranged between the display panel and the optical film, and the projection lens is used for refracting light emitted from the display panel to be parallel light emitted to the optical film, the optical film is configured to reflect the parallel light to the lens of the interactive glasses, and then the parallel light enters into an eye through the lens of the interactive glasses;
    wherein the processing unit is configured to be communicatively connected with a server.

2. The interactive glasses of claim 1, wherein
    the interactive glasses further include a storage unit, which is configured to prestore the location information of the target location, and
    the processing unit is further configured to read the location information of the target location from the storage unit.

3. The interactive glasses of claim 1, wherein
    the interactive glasses further include a target location acquisition unit, which is configured to obtain the location information of the target location, and
    the processing unit is further configured to control the target location acquisition unit to obtain the location information of the target location.

4. The interactive glasses of claim 1, wherein the optical film is a transflective film, which is configured to transmit ambient light to the lens of the interactive glasses while reflecting the parallel light, and then the ambient light and the parallel light enters into the eye through the lens of the interactive glasses.

5. The interactive glasses of claim 4, wherein the interactive glasses further include a mounting housing, which is connected to the frame, and the positioning unit and the processing unit are integrated inside the mounting housing.

6. The interactive glasses of claim 5, wherein the display panel and the projection lens are arranged inside the mounting housing, a light outlet is arranged on the mounting housing, and a fixing piece for fixing the optical film is arranged at the light outlet.

7. The interactive glasses of claim 6, wherein the fixing piece is made of a light-transmissive glass material, a cavity for holding the optical film is formed in the fixing piece, the optical film is arranged in the cavity, and both a side surface of the fixing piece away from the lens of the interactive glasses and a side surface of the fixing piece arranged at the light outlet are planes.

8. The interactive glasses of claim 6, wherein the mounting housing includes a first housing part and a second housing part, the first housing part is connected to a leg of the frame and extends in a direction that a user wearing the interactive glasses faces to, so that the first housing part protrudes from the lens of the interactive glasses, the second housing part is arranged on a side surface of the part of the first housing part that protrudes from the lens of the interactive glasses, and said side surface faces to the lens of the interactive glasses, the display panel and the projection lens are arranged inside the second housing part, and the light outlet is arranged in a side of the second housing part away from the first housing part.

9. The interactive glasses of claim 8, wherein the interactive glasses further include an image acquisition unit, which is configured to acquire a marked image and output the same to the processing unit, and
the processing unit is further configured to convert the marked image into information corresponding to the marked image.

10. The interactive glasses of claim 9, wherein
the interactive glasses further include a storage unit, which is configured to prestore the information corresponding to the marked image, and the processing unit is further configured to communicatively receive and read the information corresponding to the marked image from the storage unit; and
the interactive glasses further include a communication unit, which is configured to be communicatively connected to the server, and the processing unit is further configured to be communicatively connected to the communication unit so as to obtain the information corresponding to the marked image from the communication unit, which acquires said information from the server, according to the marked image.

11. The interactive glasses of claim 9, wherein the image acquisition unit includes a camera, which is arranged on a side surface of the second housing part away from the lens of the interactive glasses, and lens of the camera faces to a direction to which a user wearing the interactive glasses faces.

12. The interactive glasses of claim 9, wherein the interactive glasses further include a transmission unit, which is configured to allow the communication unit and the storage unit to communicate with a terminal with inputting and outputting functions, respectively, and
the terminal with inputting and outputting functions is configured to be connected to a server through the communication unit, so as to obtain network information corresponding to information inputted to the terminal with inputting and outputting functions, and display the network information through the display unit, and the information stored in the storage unit is configured to be outputted to the terminal with inputting and outputting functions through the transmission unit.

13. The interactive glasses of claim 9, wherein the interactive glasses further include an operating unit connected to the processing unit, and
the operating unit is configured to send a first operating instruction to the processing unit, and the processing unit is further configured to operate accordingly according to the first operating instruction.

14. The interactive glasses of claim 13, wherein the operating unit includes an operating key and a touch panel both arranged on the first housing part, the operating key and the touch panel penetrate a wall of the first housing part and are connected to the processing unit and are configured to send the first operating instruction to the processing unit, and the processing unit is further configured to control the display unit to display image information corresponding to the first operating instruction, according to the first operating instruction.

15. The interactive glasses of claim 13, wherein the operating unit includes an image acquisition shortcut key, which is arranged on the first housing part, and the image acquisition shortcut key penetrates a wall of the first housing part and is connected to the processing unit and is configured to send, to the processing unit, a second operating instruction for operating the image acquisition unit, and the processing unit is further configured to turn on or turn off the image acquisition unit according to the second operating instruction.

16. The interactive glasses of claim 1, wherein the interactive glasses further include a voice output unit, which is configured to output voice information corresponding to the image information displayed by the display unit.

17. A navigation system, including a server and interactive glasses including a frame and a lens, wherein the interactive glasses further include a positioning unit, a processing unit and a display unit that are fixed to the frame,
the positioning unit is configured to obtain location information of a current location of the interactive glasses;
the processing unit is configured to obtain a target location and information of a route from the current location to the target location according to the location information of the current location and location information of the target location; and
the display unit is configured to display image information for the route from the current location to the target location,
wherein the interactive glasses further include a communication unit connected to the processing unit, the communication unit is further communicatively connected to the server, and the positioning unit of the interactive glasses is configured to obtain the location information of the current location of the interactive glasses according to relevant information in the server.

18. The navigation system of claim 17, wherein the server is configured to pushing service information to the processing unit of the interactive glasses through the communication unit, the display unit is configured to displaying a service information mark corresponding to the service information, and the service information includes information of objects within a preset distance range relative to the current location of the interactive glasses.

19. The navigation system of claim 18, wherein the interactive glasses further include an operating unit connected to the processing unit, the operating unit is configured to send an operating instruction to the processing unit, and the processing unit is further configured to control the display unit to display the corresponding service information mark according to the operating instruction.

* * * * *